United States Patent
De et al.

(10) Patent No.: US 10,416,630 B2
(45) Date of Patent: Sep. 17, 2019

(54) SYSTEM AND METHOD FOR INDUSTRIAL PROCESS AUTOMATION CONTROLLER FARM WITH FLEXIBLE REDUNDANCY SCHEMA AND DYNAMIC RESOURCE MANAGEMENT THROUGH MACHINE LEARNING

(71) Applicant: Honeywell International Inc., Morris Plains, NJ (US)

(72) Inventors: Rahul De, Bangalore (IN); Avinash Rajan, Bangalore (IN); Kalyanasundaram Govindaraj, Bangalore (IN); Amol Kinage, Bangalore (IN); Ravi Kumar Ramamurthy, Bangalore (IN); James Schreder, Lansdale, PA (US); Christopher Peters, Chester, VA (US)

(73) Assignee: UOP LLC, Des Plaines, IL (US)

( * ) Notice: Subject to any disclaimer, the term of this patent is extended or adjusted under 35 U.S.C. 154(b) by 191 days.

(21) Appl. No.: 15/452,589

(22) Filed: Mar. 7, 2017

(65) Prior Publication Data

US 2018/0259923 A1 Sep. 13, 2018

(51) Int. Cl.

| G05B 19/04 | (2006.01) |
|---|---|
| G05B 19/042 | (2006.01) |
| G06F 13/16 | (2006.01) |
| G06F 13/40 | (2006.01) |

(52) U.S. Cl.
CPC ..... *G05B 19/0423* (2013.01); *G06F 13/1605* (2013.01); *G06F 13/1689* (2013.01); *G06F 13/4068* (2013.01); *G05B 2219/25096* (2013.01); *G05B 2219/25145* (2013.01)

(58) Field of Classification Search
CPC ............. G06F 11/2028; G06F 11/2038; G06F 11/2041
See application file for complete search history.

(56) References Cited

U.S. PATENT DOCUMENTS

| 4,882,702 | A | 11/1989 | Struger et al. |
| 5,396,602 | A | 3/1995 | Amini et al. |
| 5,644,700 | A | 7/1997 | Dickson et al. |
| 6,625,169 | B1 | 9/2003 | Tofano |
| 6,845,467 | B1 * | 1/2005 | Ditner ................ G05B 19/0428 714/10 |

(Continued)

OTHER PUBLICATIONS

Mangharam et al., "Embedded Virtual Machines for Robust Wireless Control Systems", 29th IEEE Int'l. Conf. on Distributed Computing Systems, Jun. 2009, 6 pages.

(Continued)

*Primary Examiner* — Brian T Misiura
(74) *Attorney, Agent, or Firm* — Paschall & Maas Law Office; James C. Paschall (57) ABSTRACT

A system includes a high speed bus and a plurality of multi-function modules coupled to the high speed bus. The plurality of multi-function modules includes at least one controller configured to execute control logic for the system. The plurality of multi-function modules also includes at least one arbitrator configured to manage the at least one controller. The plurality of multi-function modules further includes at least one input/output (IO) manager configured to interface between the at least one controller and at least one field device.

19 Claims, 4 Drawing Sheets

(56) References Cited

U.S. PATENT DOCUMENTS

| | | | | |
|---|---|---|---|---|
| 7,082,130 | B2* | 7/2006 | Borella | H04L 12/5602 370/219 |
| 8,359,112 | B2* | 1/2013 | Kephart | G05B 9/03 700/25 |
| 9,104,466 | B2* | 8/2015 | Kanso | G06F 9/46 |
| 9,483,369 | B2* | 11/2016 | Sporel | G06F 11/2023 |
| 9,952,948 | B2* | 4/2018 | Samii | G06F 11/1658 |
| 9,961,054 | B2* | 5/2018 | Buonacuore | H04L 63/205 |
| 9,983,555 | B2* | 5/2018 | Bengtson | G05B 9/02 |
| 10,078,312 | B2* | 9/2018 | Bengtson | G05B 9/03 |
| 2006/0095626 | A1 | 5/2006 | Tsay et al. | |
| 2008/0267259 | A1 | 10/2008 | Budampati et al. | |
| 2008/0307426 | A1* | 12/2008 | Toeroe | G06F 9/5044 718/104 |
| 2014/0081473 | A1* | 3/2014 | Bengtson | G05B 9/02 700/287 |
| 2015/0215300 | A1* | 7/2015 | Buonacuore | H04L 63/205 700/40 |
| 2016/0202684 | A1* | 7/2016 | Pauchet | G05B 19/0428 700/28 |
| 2016/0299497 | A1* | 10/2016 | McLaughlin | G05B 19/4185 |
| 2018/0081675 | A1* | 3/2018 | Sundaresh | G06F 8/656 |

OTHER PUBLICATIONS

Hill et al., "System Architecture Directions for Networked Sensors", ASPLOS-IX, Nov. 2000, Cambridge, MA, 12 pages.

Levis et al., "Mate: A Tiny Virtual Machine for Sensor Networks", ACM ASPLOS-X, 2002, 11 pages.

Stanley-Marbell et al., "Scylla: A Smart Virtual Machine for Mobile Embedded Systems", WMCSA, 2000, 10 pages.

Muller et al., "A Virtual Machine for Sensor Networks", ACM EuroSys, 2007, 14 pages.

Han et al., "A Dynamic Operating System for Sensor Nodes", MobiSys, 2005: The Third International Conference on Mobile Systems, Applications, and Services, 2005, p. 163-176.

Dunkels et al., "Run-Time Dynamic Linking for Reprogramming Wireless Sensor Networks", SenSys '06, Nov. 1-3, 2006, Boulder, Colorado, 14 pages.

Mangharam et al., "FireFly: A Cross-Layer Platform for Real-Time Sensor Networks", Real Time Systems Journal, 2007, 40 pages.

Hill et al., "The Platforms Enabling Wireless Sensor Networks", Communications of the ACM, Jun. 2004, vol. 47, No. 6, p. 41-46.

Rowe et al., "RT-Link: A Time-Synchronized Link Protocol for Energy-Constrained Multi-hop Wireless Networks", IEEE SECON, 2006, 10 pages.

Mangharam et al., "Voice over Sensor Networks", RTSS, 2006, 10 pages.

Polastre et al., "Versatile Low Power Media Access for Wireless Sensor Networks", SenSys '04, Nov. 3-5, 2004, Baltimore, Maryland, 13 pages.

Ye et al., "An Energy-Efficient MAC Protocol for Wireless Sensor Networks", USC/ISi Technical Report ISI-TR-543, Infocom, Jun. 2002, p. 1-10.

"FireFly 2.2 Datasheet", Wireless Sensor Networks, Aug. 20, 2007, 24 pages.

"Nano-RK: A Wireless Sensor Networking Real-Time Operating System", http://nanork.org/wiki, Nov. 2009, 3 pages.

U.S. Appl. No. 12/628,918 entitled "Wireless Controller Grids for Process Control and Other Systems and Related Apparatus and Method" filed Dec. 1, 2009, 51 pages.

* cited by examiner

SYSTEM AND METHOD FOR INDUSTRIAL PROCESS AUTOMATION CONTROLLER FARM WITH FLEXIBLE REDUNDANCY SCHEMA AND DYNAMIC RESOURCE MANAGEMENT THROUGH MACHINE LEARNING

TECHNICAL FIELD

This disclosure relates generally to industrial process control and automation systems. More specifically, this disclosure relates to a controller farm with flexible redundancy and dynamic resource management through machine learning.

BACKGROUND

Industrial plants typically include distributed control systems (DCSs), programmable logic controllers (PLCs), safety systems, and other devices that provide 1:1 redundancy to improve the availability of the system when a primary controller fails. While this solution has been a proven model in the field, the cost of installing a DCS with multiple redundant controllers is large because the operator would have to procure a pair of controllers to make the system redundant. When the primary controller fails and the plant is running on the standby controller, the entire operation of the plant runs on a single controller until the root cause of the problem is known, debugged and a solution deployed. This puts the plant at risk until redundancy is re-established. Online migrations and upgrades on controllers also carry the same risk of the plant running on a single controller until both controllers are upgraded and synchronized.

Current designs of DCSs are restricted by the limitations of a redundant pair of controllers, both from an input/output (I/O) capacity and from memory/CPU utilization. The current system designs are not flexible and are hardwired to the field I/Os. Associating devices from one controller to another controller would require re-wiring of the field connections. Resources (e.g., CPU and RAM) are also bound to one set of physical controllers. The user has no option to make use of resources in other controllers even if they are not running at full capacity; instead, the user must bear additional costs of procuring new controllers.

Peer to peer communication in terms of parameters per second for sharing data across multiple controllers is also limited. Load balancing and scheduling options are limited in a 1:1 redundancy model and rely a great deal on manual efforts to compute the optimal load and scheduling for a controller. At some points, a user would need to add additional pairs of controllers to existing systems to avoid breaches of defined scan time and performance degradation.

SUMMARY

This disclosure provides systems and methods for operating a controller farm with flexible redundancy and dynamic resource management through machine learning.

In a first embodiment, a system includes a high speed bus and a plurality of multi-function modules coupled to the high speed bus. The plurality of multi-function modules includes at least one controller configured to execute control logic for the system, at least one arbitrator configured to manage the at least one controller, and at least one input/output (IO) manager configured to interface between the at least one controller and at least one field device.

In a second embodiment, a method includes identifying a multi-function module to be replaced from among a plurality of multi-function modules in a controller farm. The method also includes selecting a standby multi-function module from the plurality of multi-function modules. The method further includes synchronizing real-time data stored in a memory of the standby multi-function module based on the multi-function module to be replaced. In addition, the method includes replacing the multi-function module with the standby multi-function module.

In a third embodiment, a controller farm includes at least one controller configured to execute control logic for the system and at least one arbitrator configured to manage the at least one controller. The controller farm also includes at least one input/output (IO) manager configured to interface between the at least one controller and at least one field device included in the system and at least one standby multi-function module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration and should not be construed in any way to limit the scope of the invention. Those skilled in the art will understand that the principles of the disclosure may be implemented in any type of suitably arranged device or system.

This disclosure is directed to a controller farm, which can be an aggregation of multi-function modules over a redundant high speed control bus that utilizes the N+X Redundancy Model. The multi-function modules are programmed to assume different personalities such as: one or more process controllers that executes control logic to monitor inputs from field devices and drive outputs; one or more arbitrators that manage the availability of controllers; one or more input/output (IO) managers that interface between the controller farm and the field instruments; and one or more standby modules that operate as a secondary module to any of the controller(s), arbitrator(s), or IO manager(s), and which during an abnormal situation like a controller failure or arbitrator failure will assume the personality and tasks of the failed module.

Figure 1:
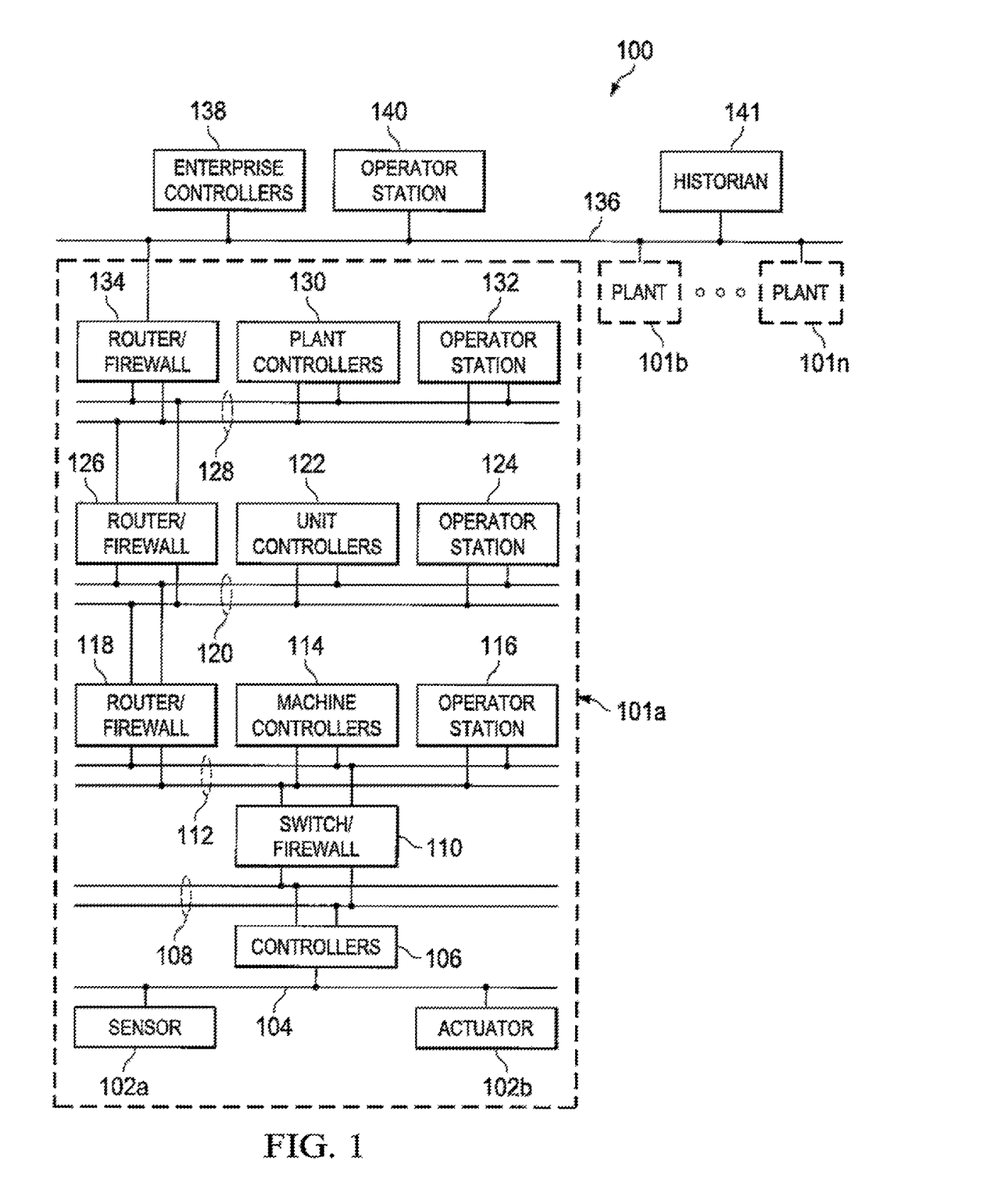
FIG. 1 illustrates an example industrial process control and automation system according to this disclosure

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

As will be discussed below, the system 100 includes one or more controller farms, each including one or more multi-function modules, which may be implemented by one or more controllers 106. Each controller farm enables enhanced availability of the system 100 in cases where one or more controllers are not available, either due to failure or during migration and upgrades. The controller farm reduces costs for an end user due to the N+X redundancy model. Load balancing and scheduling operations can be performed by the arbitrator, thereby ensuring that there is no performance degradation of critical control operations. When the load on one controller starts to increase, the arbitrator can distribute the logic operations to another controller to prevent performance degradation. The controller farm permits seamless migrations/upgrades and replacement of failed components and is able to run on a degraded mode for an extended period of time because the system availability would still be higher than that of a 1:1 redundancy model. The cost of maintaining the system 100 is also reduced because an end user does not need to maintain the same level of inventory for controllers as would be needed in other systems.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2:
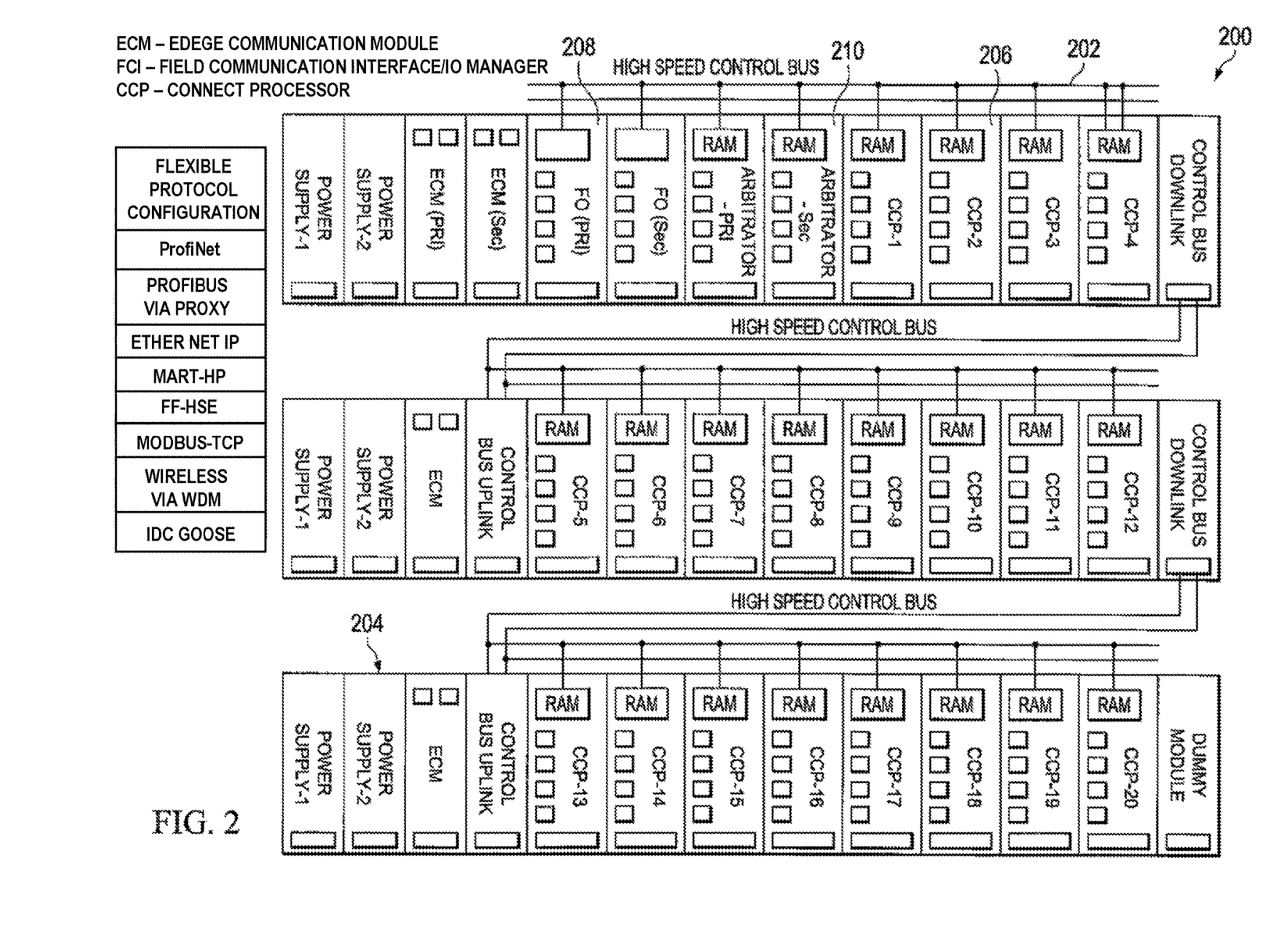
FIG. 2 illustrates an example controller farm according to this disclosure.

FIG. 2 illustrates an example controller farm 200 according to this disclosure. In particular, the controller farm 200 can be configured for use in a system with a flexible redundancy scheme and dynamic resource management through machine learning. The controller farm 200 here could represent a suitable component shown in FIG. 1 (controllers 106, 114, 122, 130, and 138), although the controller farm 200 could denote any other suitable component in the system 100 or other system containing a controller farm.

As shown in FIG. 2, the controller farm 200 includes an aggregation of multi-function modules 204-210 connected to each other via a high speed control bus 202. The controller farm 200 uses an N+X redundancy model where N represents the number of active controllers and X represents the number of standby controllers and X is less than N. Each multi-function module 204-210 may be programmed with a different function or personality. For example, the multi-function module 206 may be configured as a process controller that can execute control logic to monitor inputs from field device and drive outputs. Some multi-function modules, such as the module 208, may be configured as an IO manager that acts as an interface between the controller farm 200 and one or more field devices 106 of FIG. 1. The multi-function module 210 may be configured as an arbitrator that manages the availability of the process controllers using the N+X redundancy model. Other multi-function modules 204-210 may be configured as a standby module which assumes the function or personality of a failed multi-function module (e.g., a process controller or arbitrator).

The arbitrator 210 acts as the brain of the controller farm and N+X redundancy model. The arbitrator 210 may comprise one or more algorithms to constantly learn the key aspects of the system 100 and make decisions on how to reallocate resources without compromising the availability of the system 100. The arbitrator 210 perceives the functioning of the entire system 100 and make decisions in the best interest of the system 100. For example, the arbitrator 210 can derive some of its learning by extracting data from, for example, various aspects of the system 100. One such aspect may include CPU and memory statistics from one or more process controllers at the controller level or an overall controller farm level. Another aspect may include communication paths between individual controllers and field devices via the IO manager 208 by monitoring data traffic on the various communication paths. The arbitrator 210 may make decisions on routing data and control to different process controllers based on the data traffic. Other aspects may include loop execution times for various control strategies and patterns of varying controller loads and communication paths The controller farm 200 does not have any negative impacts on response time needs of control strategies because the arbitrator 210 identifies interdependencies between control strategies. The arbitrator 210 allocates interdependent control strategies on the same controller or a set of controllers with optimized peer to peer communication. Based on the control strategy dependencies and response time requirements, the controllers in the controller farm 200 may have synchronous execution cycles that may help reduce the jitter in peer to peer communication to a minimum and help the arbitrator 210 to make decisions on allocation of controllers to control strategies.

The arbitrator 210 also manages availability of the controllers without causing any Loss of Control (LOC) or Loss of View (LOV) for processes. When a process controller 206 fails, the arbitrator 210 can identify which controller on standby will assume the role of the failed process controller 206. Real-time working data for each of the process controllers 206, arbitrator 210, and IO manager 208 is stored in a memory (e.g., RAM) of each multi-function module 204-210 that are connected to the high speed control bus 202. The memory may include data that is accessed from the field devices through the IO manager 208, the computed data from each of the process controllers 206, and the managed data from the arbitrator 210. When a multi-function module on standby assumes the role of the process controller 206, the standby multi-function module syncs up controller specific real-time data from its internal memory and takes up the active functions of the failed controller without entering into a LOC/LOV situation.

Figure 3:
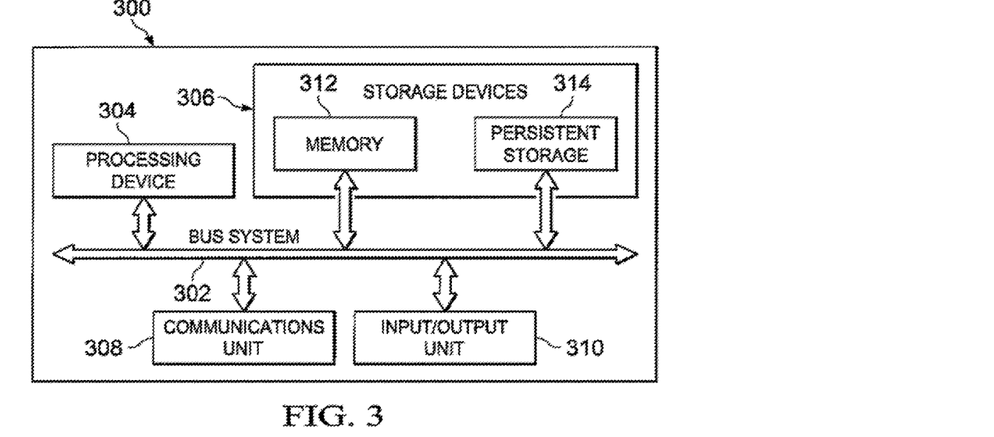
FIG. 3 illustrates an example structure of a computing device according to this disclosure.

FIG. 3 illustrates an example computing device 300 according to this disclosure. The computing device 300 could represent, or be represented by, all or portions of a multi-function module for use in a controller farm. In particular, the computing device 300 could represent a suitable component shown in FIG. 2, although the computing device 300 could denote any other suitable component in the controller farm 200 or other similar system.

As shown in FIG. 3, the device 300 can include a bus system 302, which supports communication between at least one processing device 304, at least one storage device 306, at least one communications unit 308, and at least one input/output (I/O) unit 310. The processing device 304 executes instructions that may be loaded into a memory 312. The processing device 304 may include any suitable number(s) and type(s) of processors or other devices in any suitable arrangement. Example types of processing devices 304 include microprocessors, microcontrollers, digital signal processors, field programmable gate arrays, application specific integrated circuits, and discrete circuitry.

The memory 312 and a persistent storage 314 are examples of storage devices 306, which represent any structure(s) capable of storing and facilitating retrieval of information (such as data, program code, and/or other suitable information on a temporary or permanent basis). The memory 312 may represent a random access memory or any other suitable volatile or non-volatile storage device(s). The persistent storage 314 may contain one or more components or devices supporting longer-term storage of data, such as a read only memory, hard drive, Flash memory, or optical disc. In accordance with this disclosure, the memory 312 and the persistent storage 314 may be configured to store instructions associated with configuring the controller farm in a distributed control system.

The communications unit 308 supports communications with other systems, devices, or networks, such as the networks 110-120. For example, the communications unit 308 could include a network interface that facilitates communications over at least one Ethernet network. The communications unit 308 could also include a wireless transceiver facilitating communications over at least one wireless network. The communications unit 308 may support communications through any suitable physical or wireless communication link(s).

The I/O unit 310 allows for input and output of data. For example, the I/O unit 310 may provide a connection for user input through a keyboard, mouse, keypad, touchscreen, or other suitable input device. The I/O unit 310 may also send output to a display, printer, or other suitable output device.

Although FIG. 3 illustrates one example of a computing device 300, various changes may be made to FIG. 3. For example, various components in FIG. 3 could be combined, further subdivided, rearranged, or omitted and additional components could be added according to particular needs. Also, computing devices come in a wide variety of configurations, and FIG. 3 does not limit this disclosure to any particular computing device.

Figure 4:
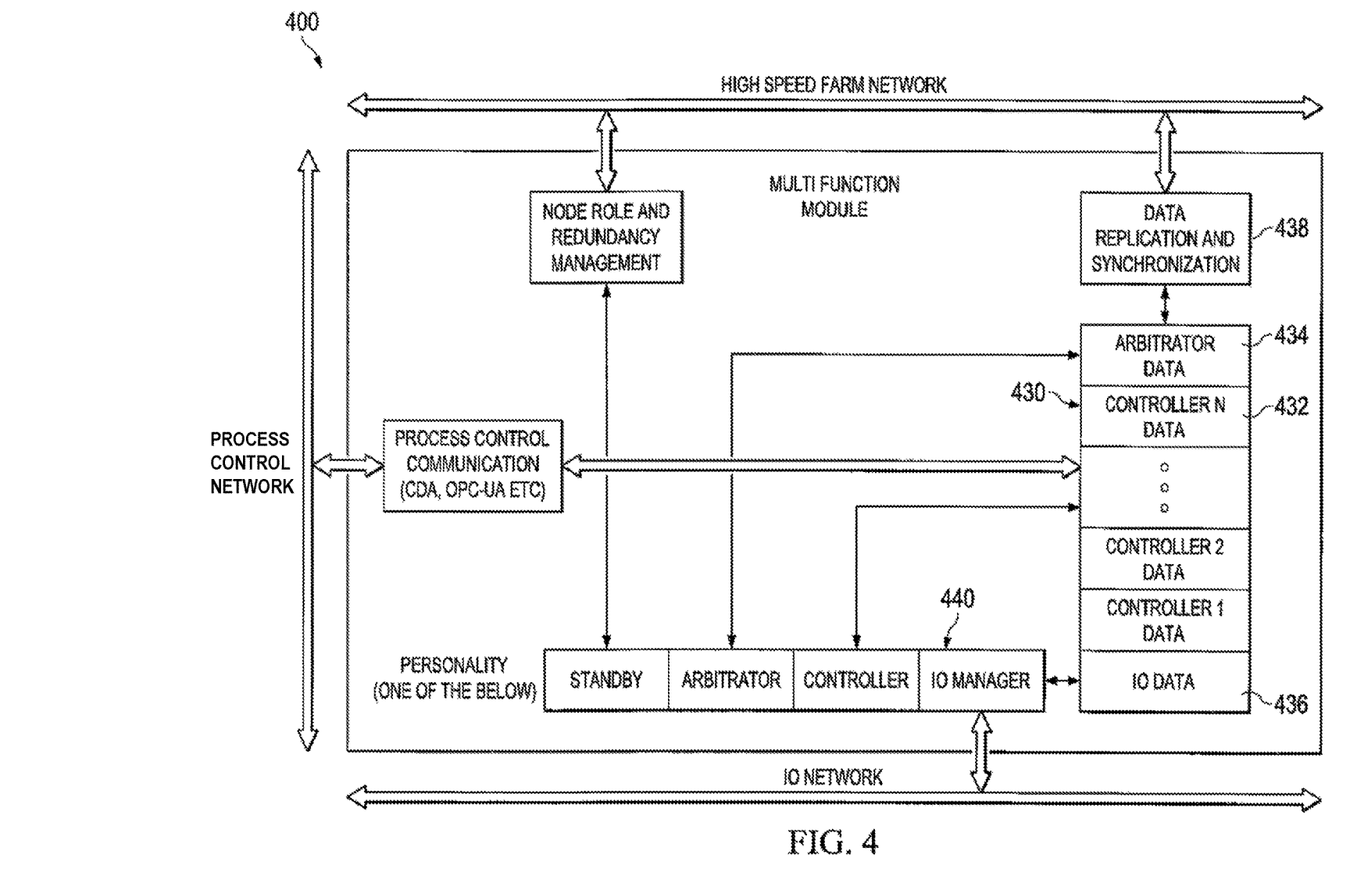
FIG. 4 illustrates an example system block diagram of a multi-function module according to this disclosure.

FIG. 4 illustrates an example system block diagram of a multi-function module 400 according to this disclosure. The multi-function module 400 may include one, some, or all of the components of the computing device 300 of FIG. 3. In addition, as shown in FIG. 4, the multi-function module 400 includes a data bank 430 which includes real-time controller data 432 from all controllers, arbitrator data 434, and IO mapping data 436 from IO managers. The data bank 430 may also employ a unique addressing scheme to manage the data in the data bank 430. The addressing scheme would ensure that field data specific to a controller is addressed/accessible by that controller. The data bank 430 may be stored on the memory 304 as shown in FIG. 3. The data bank 430 is updated with real-time data by a data replication and synchronization module 438 that may be executed by a processor, such as the processor 302 of FIG. 3. Based on the personality 440 that the multi-function module 400 undertakes, the processor 302 can access data from the data bank 430 as a working set while the data from the remaining modules on the controller farm are synced over a high speed control bus by the data replication and synchronization module 438.

Although FIG. 4 illustrates one example of a multi-function module 400, various changes may be made to FIG. 4. For example, various components in FIG. 4 could be combined, further subdivided, rearranged, or omitted and additional components could be added according to particular needs. Also, computing devices come in a wide variety of configurations, and FIG. 4 does not limit this disclosure to any particular computing device.

Figure 5:
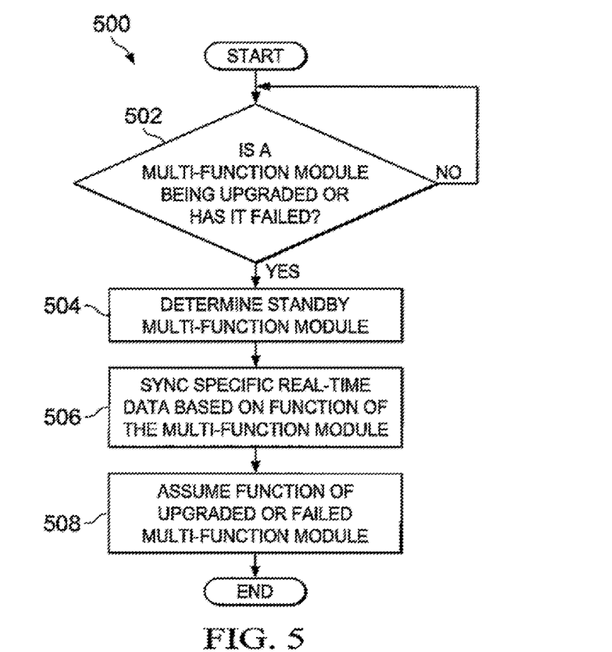
FIG. 5 illustrates an example method for replacing a multi-function module according to the disclosure.

FIG. 5 illustrates an example method 500 for replacing a multi-function module according to the disclosure. For ease of explanation, the method 500 is described with respect to the multi-function module 400 of FIG. 4 operating in the system 100 of FIG. 1. More specifically, a processor of the multi-function module 400 (such as the processor 302 of FIG. 3) can be used to perform the method 500. However, the method 500 could be used by any other suitable device and in any other suitable system.

As shown in FIG. 5, a determination is made as to whether one or more multi-function modules 400 are being upgraded or having a failure in step 502. The determination may be made by the processor on any one of the multi-function modules 400 in the controller farm. The determination may be made based on a user input or a failure may be detected by the processor. Once the determination is made, an arbitrator selects a standby multi-function module in step 504 to replace the upgraded or failed multi-function module. The standby multi-function module accesses the data bank 430 to sync the real-time data stored therein based on the function that that standby multi-function module will assume in step 506. For example, if the standby multi-function module assumes the function of a controller, the standby multi-function module will access the controller data 432. After syncing the data, the standby multi-function module assumes the function of the upgraded or failed multi-function module in step 508.

Although FIG. 5 illustrates one example of a method 500 for replacing a multi-function module, various changes may be made to FIG. 5. For example, the method 500 can be used with any other suitable devices and in any other suitable system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
  a high speed bus; and
  a plurality of multi-function modules coupled to the high speed bus, the plurality of multi-function modules comprising:
    at least one controller configured to execute control logic for the system;
    at least one arbitrator configured to manage the at least one controller utilizing an N+X redundancy model where N is a number of active controllers and X is a number of standby controllers, wherein the arbitrator receives CPU and memory statistics from one or more process controllers and data traffic from the communication paths between individual controllers and field devices and is arranged to make control and data routing decisions to the one more controllers of the plurality of multi-function modules based on the statistics and data traffic received to configure each multi-function module for a different function; and
    at least one input/output (IO) manager configured to interface between the at least one controller and at least one field device.

2. The system of claim 1, wherein the plurality of multi-function modules further comprises a standby module.

3. The system of claim 2, wherein, when the at least one controller fails, the at least one arbitrator is configured to select the standby module to assume a function of the at least one controller.

4. The system of claim 3, wherein each multi-function module includes a memory configured to store real-time data from the at least one controller, the at least one arbitrator, or the at least one IO manager.

5. The system of claim 4, wherein, when the standby module assumes a function of the at least one controller, the standby module is configured to synchronize the real-time data from the memory for the at least one controller.

6. The system of claim 1, wherein the at least one arbitrator is configured to extract data from the at least one controller.

7. The system of claim 6, wherein the data includes processing and memory statistics.

8. The system of claim 1, wherein the at least one field device is flexibly assigned to the at least one controller.

9. A method comprising:
  identifying by a processor a multi-function module to be replaced from among a plurality of multi-function modules in a controller farm;
  selecting by an arbitrator a standby multi-function module from the plurality of multi-function modules utilizing an N+X redundancy model where N is a number of active controllers and X is a number of standby controllers in a controller farm, wherein the arbitrator receives CPU and memory statistics from one or more process controllers and data traffic from the communication paths between individual controllers and field devices and is arranged to make control and data routing decisions to the one more controllers of the plurality of multi-function modules based on the statistics and data traffic received to configure each multi-function module for a different function;
  synchronizing real-time data stored in a memory of the standby multi-function module based on the multi-function module to be replaced; and
  replacing the multi-function module with the standby multi-function module.

10. The method of claim 9, wherein the plurality of multi-function modules includes at least one controller, at least one arbitrator, and at least one input/output (IO) manager.

11. The method of claim 10, wherein the standby multi-function module is selected by the at least one arbitrator to replace the multi-function module.

12. The method of claim 10, further comprising synchronizing real-time data corresponding to the controller from the memory included in the standby multi-function module when the multi-function module to be replaced is a controller.

13. A controller farm comprising:
  at least one controller configured to execute control logic for controlling a system;
  at least one arbitrator configured to manage the at least one controller utilizing an N+X redundancy model where N is a number of active controllers and X is a number of standby controllers, wherein the arbitrator receives CPU and memory statistics from one or more process controllers and data traffic from the communication paths between individual controllers and field devices and is arranged to make control and data routing decisions to the one more controllers of the plurality of multi-function modules based on the statistics and data traffic received to configure each multi-function module for a different function;
  at least one input/output (IO) manager configured to interface between the at least one controller and at least one field device included in the system; and
  at least one standby multi-function module.

14. The controller farm of claim 13, wherein, when the at least one controller fails, the at least one arbitrator is configured to select the standby multi-function module to assume a function of the at least one controller.

15. The controller farm of claim 13, wherein the standby multi-function module includes a memory configured to store real-time data from the at least one controller, the at least one arbitrator, or the at least one TO manager.

16. The controller farm of claim 15, wherein, when the standby multi-function module assumes a function of the at least one controller, the standby multi-function module is configured to synchronize the real-time data from the memory for the at least one controller.

17. The controller farm of claim 13, wherein the at least one arbitrator is configured to extract data from the at least one controller.

18. The controller farm of claim 17, wherein the data includes processing and memory statistics.

19. The controller farm of claim 17, wherein the at least one arbitrator is configured to allocate at least one control strategy to the at least one controller to balance a resource load on the at least one controller based on the data extracted from the at least one controller.

* * * * *